United States Patent
Uoi et al.

(10) Patent No.: US 8,024,663 B2
(45) Date of Patent: Sep. 20, 2011

(54) COMPOSITION ASSISTING APPARATUS AND COMPOSITION ASSISTING SYSTEM

(75) Inventors: Hirotaka Uoi, Shijonawate (JP); Hideyoshi Mikata, Shijonawate (JP)

(73) Assignee: Osaka Electro-Communication University, Neyagawa-Shi, Osaka (JP)

( * ) Notice: Subject to any disclaimer, the term of this patent is extended or adjusted under 35 U.S.C. 154(b) by 0 days.

(21) Appl. No.: 12/515,248

(22) PCT Filed: Nov. 17, 2006

(86) PCT No.: PCT/JP2006/323024
§ 371 (c)(1),
(2), (4) Date: Jan. 19, 2010

(87) PCT Pub. No.: WO2008/059594
PCT Pub. Date: May 22, 2008

(65) Prior Publication Data
US 2010/0146405 A1    Jun. 10, 2010

(51) Int. Cl.
*G06F 3/00* (2006.01)
*G06F 3/01* (2006.01)
(52) U.S. Cl. ........ 715/758; 715/748; 715/750; 715/751; 715/753
(58) Field of Classification Search .................. 715/748, 715/750, 751, 753, 756, 758, 759
See application file for complete search history.

(56) References Cited

U.S. PATENT DOCUMENTS

| | | | |
|---|---|---|---|
| 6,882,975 B2 * | 4/2005 | Yotoriyama et al. | 704/275 |
| 7,309,826 B2 * | 12/2007 | Morley et al. | 84/483.1 |
| 7,415,501 B2 | 8/2008 | Burstrom | |
| 7,478,129 B1 * | 1/2009 | Chemtob | 709/204 |
| 7,519,667 B1 * | 4/2009 | Capps | 709/206 |
| 7,672,543 B2 * | 3/2010 | Hull et al. | 382/305 |
| 2001/0007960 A1 | 7/2001 | Yoshihara et al. | |
| 2003/0097408 A1 | 5/2003 | Kageyama et al. | |
| 2004/0025668 A1 * | 2/2004 | Jarrett et al. | 84/477 R |

(Continued)

FOREIGN PATENT DOCUMENTS

JP    H07-152313    6/1995

(Continued)

OTHER PUBLICATIONS

"GarbageBand3", Getting Started—by Apple—software user manual for music.

(Continued)

*Primary Examiner* — Nicholas Augustine
(74) *Attorney, Agent, or Firm* — Foley & Lardner LLP

(57) ABSTRACT

[Object] To provide communication space for the user to have crossing over of discussions with respect to plural phrases while allowing the discussions to be conducted individually in parallel.
[Means for Solution] A module for generating phrase object (FO) data which contain identification information of phrase data and position information of a FO on a chat canvas (CC), a module for generating chat data which contain message text data and display position information on CC, a module for transmitting the chat data to a server, and receiving the chat data distributed from the server, a module for transmitting the FO data to the server and receiving the FO data distributed from the server, and a module for displaying the FO or the message text on the CC based on the FO data or the chat data are provided. The display mode of the message text is determined based on the display mode of the FO located close to the display position of the message text.

6 Claims, 14 Drawing Sheets

U.S. PATENT DOCUMENTS

| | | | |
|---|---|---|---|
| 2006/0236221 A1* | 10/2006 | McCausland et al. | 715/500.1 |
| 2006/0253542 A1* | 11/2006 | McCausland et al. | 709/207 |
| 2007/0089151 A1* | 4/2007 | Moore et al. | 725/132 |
| 2007/0193435 A1* | 8/2007 | Hardesty et al. | 84/609 |

FOREIGN PATENT DOCUMENTS

| | | |
|---|---|---|
| JP | 2001-117849 | 4/2001 |
| JP | 2001-195064 | 7/2001 |
| JP | 2001-344184 | 12/2001 |
| JP | 2002-259635 | 9/2002 |
| JP | 2003-150529 | 5/2003 |
| JP | 2003-152313 | 5/2003 |
| JP | 2003-528386 | 9/2003 |
| WO | WO 2008/059594 | 5/2008 |

OTHER PUBLICATIONS

International Search Report for International Patent Application No. PCT/JP2006/323024 dated Feb. 6, 2007.

Mikata, H. et.al., "Composing Music Interface with 2D Chat System," WISS2005, 2005 (w/English Abstract).

"TransJam-Jammin on the Web!" [online] http://www.transjam.com/webdrum Searched on Aug. 29, 2006, (Java based server), TransJam, is a product of SoftSynth.com © 1997-2004.

* cited by examiner

FIG. 2
(A)
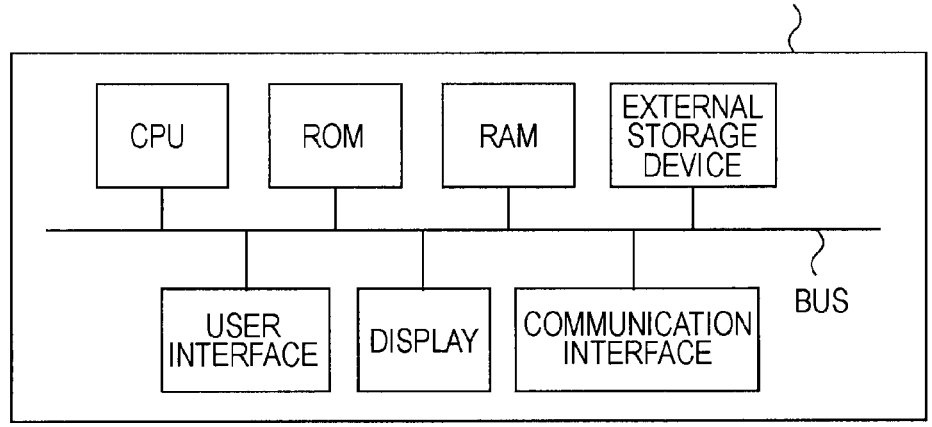
(B)
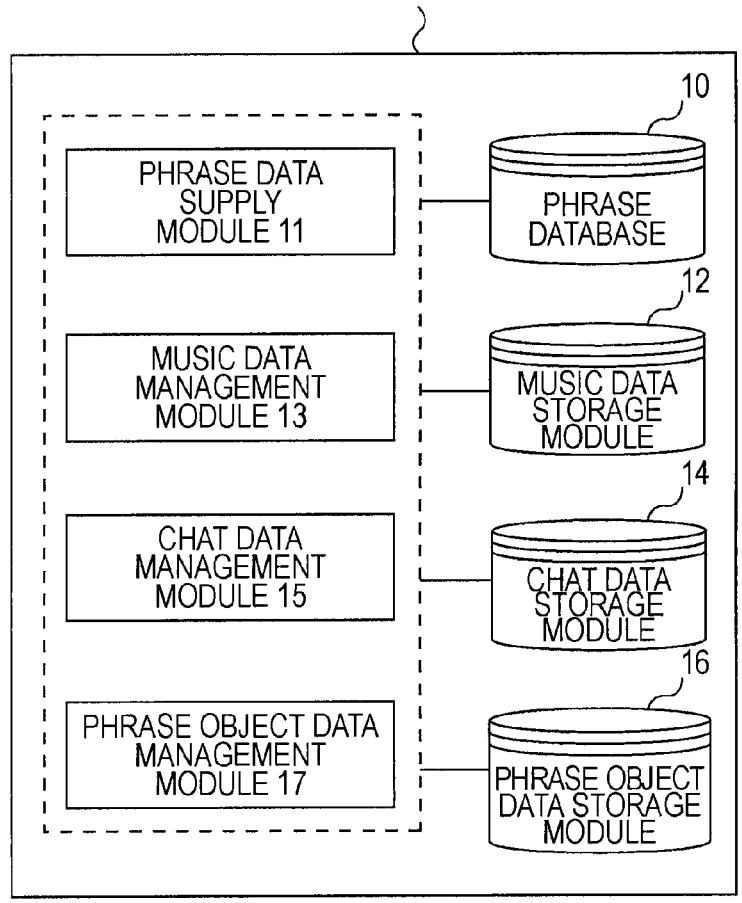

FIG. 4

| INSTRUMENT | PHRASE DATA ID INFORMATION | PHRASE DATA |
|---|---|---|
| GUITAR | 1-01 | 101.mid |
| | 1-02 | 102.mid |
| | ⋮ | ⋮ |
| DRUM | 2-01 | 201.mid |
| | 2-02 | 202.mid |

FIG. 6

| TIME LINE NO. | PHRASE DATA ID INFORMATION | | | |
|---|---|---|---|---|
| | GUITAR | DRUM | PIANO | BASS GUITAR |
| 01 | 1-01 | 2-03 | 3-04 | 4-04 |
| 02 | 1-10 | 2-04 | 3-08 | 4-04 |
| 03 | 1-12 | 2-03 | 3-09 | 4-07 |

FIG. 7

| PHRASE DATA ID INFORMATION | PHRASE DATA |
|---|---|
| 1-01 | 101.mid |
| 1-10 | 110.mid |
| 1-12 | 112.mid |
| 2-03 | 203.mid |
| 2-04 | 204.mid |

PHRASE DATA TITLE

Rock Beat 03

INSTRUMENT ICON

| PHRASE OBJECT DATA ID INFORMATION | PHRASE OBJECT DATA |||
|---|---|---|---|
| | PHRASE DATA ID INFORMATION | CHAT CANVAS POSITION INFORMATION | COLOR INFORMATION |
| 01 | 1-01 | (5,4) | BLUE |
| 02 | 2-03 | (90,150) | RED |
| 03 | 3-04 | (10,200) | GREEN |

FIG. 16
(A)
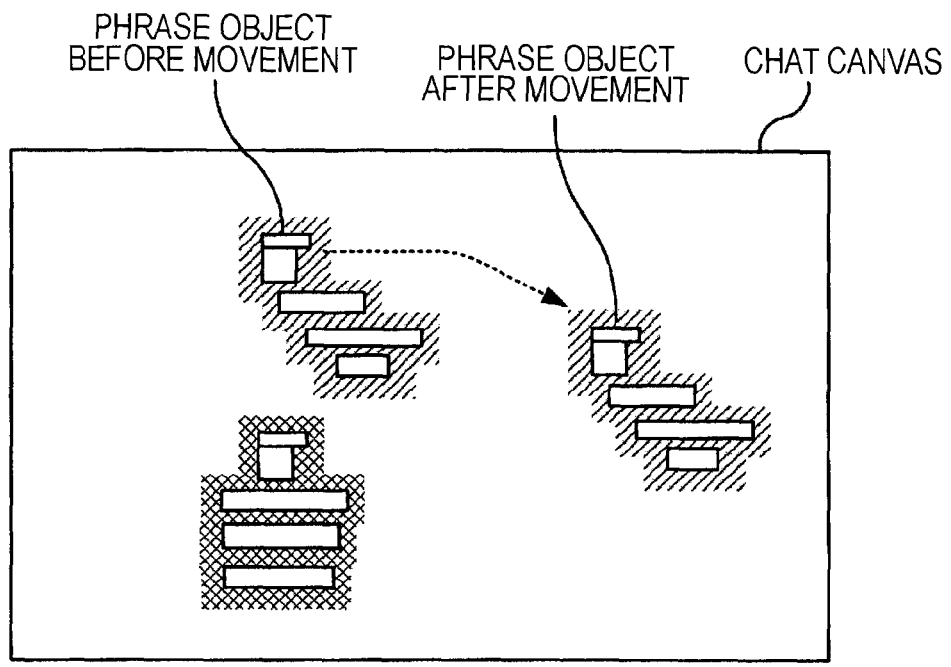
(B)
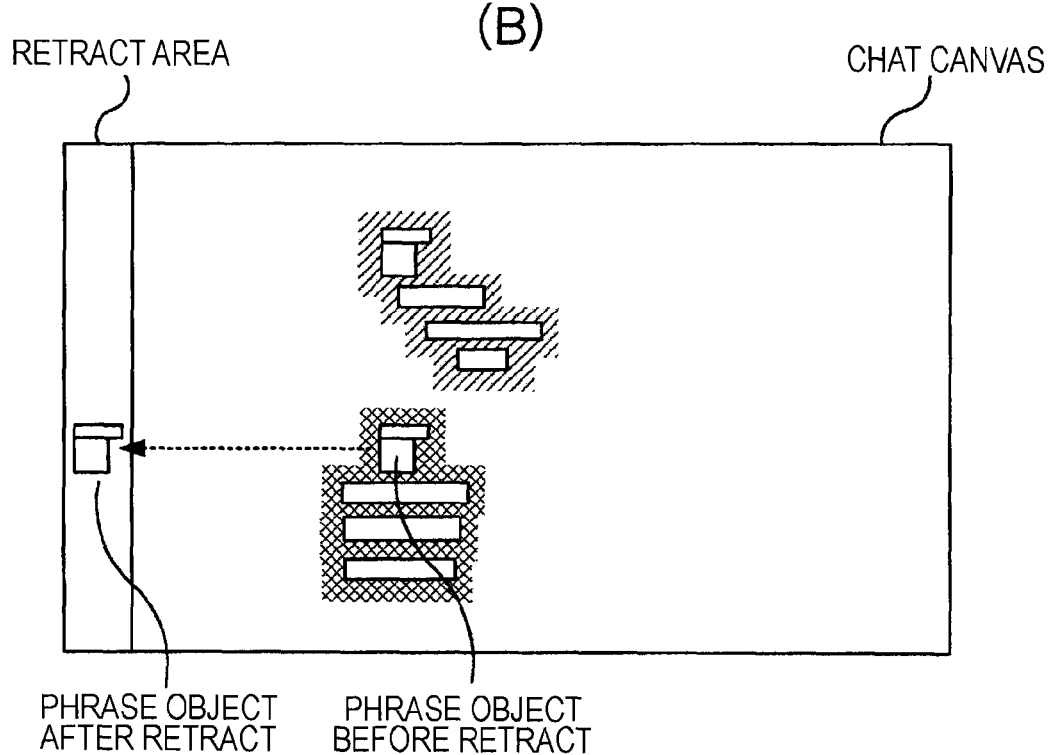

COMPOSITION ASSISTING APPARATUS AND COMPOSITION ASSISTING SYSTEM

TECHNICAL FIELD

The present invention relates to an assisting tool and an assisting system for composing by combining phrases, and more particularly, to a composition assisting tool and a composition assisting system effective for plural users to compose collaboratively.

BACKGROUND ART

A frame-base composition tool is well known as the tool operated in the information processor such as a personal computer to compose by combining desired phrases selected from prepared phrases of a plurality of instruments (Non-Patent Document 1).

The phrase-forming tool which allows plural uses to create the phrase collaboratively via the network has also been distributed (Non-Patent Document 2). The phrase-forming tool has realized the communication among plural users via the text chat system for creating the phrase while allowing those users to share the information.

[Non-Patent Document 1]
"GarageBand3", [online], <URL: http://www.apple.com/ip/ilife/garageband/> searched on Aug. 29, 2006.
[Non-Patent Document 2]
"TransJam-Jammin' on the Web!" [online], <URL: http://www.transjam.com/webdrum> searched on Aug. 29, 2006.

DISCLOSURE OF INVENTION

Problems to be Solved by the Invention

The inventors of the present invention have the following findings after studying on the composing method which allows plural users to collaborate in the frame-base composition (hereinafter referred to as "collaborative frame-base composition method") via the network by combining desired phrases selected from prepared plural phrases shared by those uses.

In the case where the plural users collaborate in the frame-base composition, if each of the plural phrases to compose the music is discussed individually in parallel, the composition may be efficiently conducted while sufficiently discussing about the respective phrases. Meanwhile, it is preferable to proceed the composition by crossing over of discussions on the respective phrases which are closely related with one another as parts of the piece of music.

It has been found that the conventional chat system as disclosed in Non-Patent Document 2, specifically, the chat system having the messages input by the users displayed on the chat window in descending order (along one-dimensional time axis) fails to provide the communication space suitable for the collaborative frame-base composition method, and is unable to sufficiently assist the composition for the reasons described below.

Assuming that the conventional chat system is used to allow the users to discuss about plural phrases in parallel using a single chat window, discussions on the plural phrases may be mixed on the single chat window. This makes it difficult for the users to discuss about the respective phrases individually. Meanwhile, the conventional chat system allows the users to discuss about the respective phrases individually in parallel using the plural chat windows. In the aforementioned case, however, discussion about each of plural phrases will be closed within each window, and accordingly, crossing over of the discussions about various phrases cannot be made.

It is an object of the present invention to provide a new framework which allows appropriate composition assistance by realizing communication space suitable for the collaborative frame-base composition in terms of being able to make users cross over of discussions with respect to plural phrases appropriately while allowing the discussions to be conducted individually in parallel.

Means for Solving the Problems

A composition assisting apparatus according to the present invention includes a phrase object set module for forming phrase object data which contain at least identification information of phrase data designated by a user, and position information of an object for indicating a position where a phrase unit discussion is opened (hereinafter referred to as "phrase object") on a two-dimensional region (hereinafter referred to as "chat canvas") upon reception of a command for opening a discussion designating the phrase from the user, a chat data input module for generating chat data which contain at least text data of a message input by the user, and display position information on the chat canvas upon reception of a command for inputting the chat data from the user, a chat data management module for transmitting the generated chat data, receiving the chat data distributed from the server and storing the chat data in a memory, a phrase object data management module for transmitting the generated phrase object data to the server, receiving the phrase object data distributed from the server, and storing the phrase object data in the memory, and a display module for displaying the phrase object or the message text data on the chat canvas based on the phrase object data or the chat data stored in the memory. A display mode of the message text data is determined based on a display mode of the phrase object located close to a display position of the message text data.

Preferably, the apparatus includes a phrase data acquisition module for acquiring the phrase data from a database for storing the phrase data in correlation with phrase identification information based on the input by the user and storing the phrase data in the memory, and a player module for playing the phrase data stored in the memory.

Preferably, the apparatus further includes a music data creation module for creating music data by combining the acquired phrase data, and a music data management module for transmitting the created music data to the server, receiving the music data distributed from the server, and storing the music data in the memory. The player module plays the music data stored in the memory.

A composition assisting system according to the present invention includes at least one server and a plurality of terminals. The terminal includes a phrase object set module for generating phrase object data which contain at least identification information of phrase data designated by a user, and position information of an object for indicating a position where a phrase unit discussion is opened (hereinafter referred to as "phrase object") on a two-dimensional region (hereinafter referred to as "chat canvas") upon reception of a command for opening the discussion designating the phrase from the user, a chat data input module for generating chat data which contain at least text data of a message input by the user and display position information on the chat canvas upon reception of a command for inputting the chat data from the user, a chat data management module for transmitting the generated chat data to the server, receiving the chat data distributed from the server, and storing the chat data in a memory, a phrase object data management module for transmitting the generated phrase object data to the server, receiving the phrase object data distributed from the server, and storing the phrase object data in the memory, and a display module for displaying the phrase object or the message text data on the chat canvas based on the phrase object data or the chat data stored in the memory. The server includes a phrase object data management server module for receiving the phrase object data from the terminal, storing the received phrase object data in a memory, and distributing the stored phrase object data to the terminal. A display mode of the message text data is determined based on a display mode of the phrase object located close to the display position of the message text data.

A phrase base composition assisting method according to the present invention includes a phrase object set step for generating phrase object data which contain at least identification information of phrase data designated by a user, and position information of an object for indicating a position where a phrase unit discussion is opened (hereinafter referred to as "phrase object") on a two-dimensional region (hereinafter referred to as "chat canvas") upon reception of a command for opening the discussion designating the phrase from the user, a chat data input step for generating chat data which contain at least text data of a message input by the user and display position information on the chat canvas upon reception of a command for inputting the chat data from the user, a chat data management step for transmitting the generated chat data to the server, receiving the chat data distributed from the server, and storing the chat data in a memory, a phrase object data management step for transmitting the generated phrase object data to the server, receiving the phrase object data distributed from the server, and storing the phrase object data in the memory, and a display step for displaying the phrase object or the message text data on the chat canvas based on the phrase object data or the chat data stored in the memory. A display mode of the message text data is determined based on a display mode of the phrase object located close to the display position of the message text data.

The program (program product) according to the present invention allows the computer to execute respective steps of the composition assisting method according to the present invention. The program (program product) according to the present invention may be installed or loaded in the computer through various types of recording medium such as the CD-ROM, the magnetic disk, and the semiconductor memory or by downloading via the communication network.

In the description, the module represents not only the physical device but also execution of at least a part of the function of the module by the software. The function of the single module may be realized by two or more physical devices, or functions of two or more modules may be realized by the single physical device.

Advantages

The present invention provides the new framework which allows appropriate composition assistance by realizing the communication space suitable for the collaborative frame-base composition in terms of being able to make users cross over of discussions with respect to plural phrases appropriately while allowing the discussions to be conducted individually in parallel.

BEST MODE FOR CARRYING OUT THE INVENTION

An embodiment of the present invention will be described referring to the drawings.

FIG. 1 is a block diagram schematically showing a composition assisting system 100 as an embodiment of the present invention. Referring to the drawing, the composition assisting system 100 includes a composition assisting server 1 and plural composition assisting terminals 2a to 2d corresponding to users who participate in the composition project, respectively. The composition assisting server 1 and the respective composition assisting terminals 2a to 2d (hereinafter referred to as "composition assisting terminal 2" when distinction is not required.) are mutually communicated with one another via a predetermined communication network N (LAN, internet, exclusive line, packet communication network, and an arbitrary combination thereamong, and including wired and wireless). Each number of the composition assisting server 1 and the composition assisting terminal 2 may be changed in accordance with the design.

FIG. 2(a) is a block diagram of a hardware structure of the composition assisting server 1. Referring to the drawing, the composition assisting server 1 may be formed of a general-purpose computer which includes such hardware as the CPU, ROM, RAM, external storage unit, user interface, display and communication interface. The composition assisting server 1 may be formed of the single computer or plural computers distributed on the network.

FIG. 2(b) is a block diagram showing a main function structure of the composition assisting server 1. Referring to the drawing, the composition assisting server 1 includes a phrase database 10 which stores various phrase data and a phrase data supply module 11 which outputs the phrase data stored in the phrase database in response to the download request from the composition assisting terminal 2 for the purpose of allowing users to share the phrase data.

The server further includes a music data management server module 13 which receives the music data from the composition assisting terminal 2, stores/manages the received music data in a music data storage server module 12, and performs multi-address transmission (distribution) of the managed music data to the respective composition assisting terminals 2 for the purpose of allowing the users to share the music data for the collaborative composition.

The format for the phrase data and the music data may be determined in accordance with the design. In the embodiment, MIDI (Musical Instrument Digital Interface) is employed as the format for the phrase data and the music data. The phrase database 10 preliminarily stores plural MIDI type phrase data with respect to four kinds of instruments, that is, guitar, drum, piano, and bass guitar. FIG. 4 shows an exemplary data structure of the phrase database 10.

Referring to FIG. 2(b), the composition assisting server 1 includes the same function structure as that of the generally employed chat server for the purpose of providing the communication space for the users to share the information. Specifically, the server includes a chat data management server module 15 which receives the chat data and various requests from the composition assisting terminals 2, and stores/manages the received chat data in a chat data storage server module 14 for distributing the managed chat data to the respective composition assisting terminals 2, etc.

The composition assisting server 1 of the embodiment is formed by expanding the function of the generally employed chat server so as to be adapted not only to the generally employed chat system but also adapted to the two-dimensional chat system capable of displaying the message on the arbitrary position on the two-dimensional window region (hereinafter referred to as the chat canvas").

The two-dimensional chat system formed as the embodiment is structured to provide the object indicating the location of the discussion for each phrase (hereinafter referred to as "phrase object") on the chat canvas. The composition assisting server 1 includes a phrase object data management server module 17 which receives the phrase object data that contain at least the phrase data identification information and phrase object position information on the chat canvas from the composition assisting terminal 2, and stores/manages the received phrase object data in a phrase object data storage server module 16 for distributing the stored phrase object data to the respective composition assisting terminals 2.

Each of the function modules of the composition assisting server 1 is realized by the CPU which executes the predetermined program stored in the ROM, RAM, external storage unit, etc.

FIG. 3(*a*) is a block diagram showing the hardware structure of the composition assisting terminal 2. Referring to the drawing, the composition assisting terminal 2 may be formed of the general-purpose computer which includes such hardware as the CPU, ROM, RAM, external storage device, user interface, display, MIDI sound source, speaker and communication interface. The mobile terminal may be employed as the composition assisting terminal 2 instead of the general-purpose personal computer.

FIG. 3(*b*) is a block diagram showing a main function structure of the composition assisting terminal 2. Referring to the drawing, the composition assisting terminal 2 essentially includes the same functions as those of the generally employed phrase-base composition tool, for example, a player module 22 for playing phrase data stored in a phrase data storage module 20 and the music data stored in a music data storage module 21, and a music data creation module 23 for creating the music data by combining the phrase data stored in the phrase data storage module 20 (including the case for additionally combining the phrase data with the music data in process of creation).

The composition assisting terminal 2 of the embodiment includes a phrase data acquisition module 24 which transmits the download request designating the phrase data to the composition assisting server 1, acquires the phrase data transmitted from the composition assisting server 1 in response to the request, and stores the acquired phrase data in the phrase data storage module 20, and a music data management module 25 which transmits the created music data to the composition assisting server 1, and stores/manages the music data distributed from the composition assisting server 1 in the music data storage module 21 for the purpose of allowing the users to share the phrase data and the music data.

The composition assisting terminal 2 of the embodiment includes the same function structure as that of the generally employed chat terminal for the purpose of providing the communication space for the users to share the information. Specifically, the terminal includes a chat data input module 26 which receives chat data including message text data, and various requests from the user, a chat data management module 28 which transmits the input chat data and various requests to the composition assisting server 1, and stores/manages the chat data distributed from the composition assisting server 1 in a chat data storage module 27, and a chat canvas display module 29 which displays the message text data on the chat canvas based on the chat data stored in the chat data storage module 27.

The composition assisting terminal 2 of the embodiment is formed by expanding the function of the generally employed chat terminal so as to be adapted to the two-dimensional chat system likewise the composition assisting server 1 (that is, each module is allowed to process the chat data containing at least the message text data and the position information on the chat canvas).

The two-dimensional chat system formed by the embodiment is structured to provide the phrase object on the chat canvas. For this, the composition assisting terminal 2 has the following structure.

That is, the composition assisting terminal 2 includes a phrase object set module 30 which generates the phrase object data upon reception of the command for opening the discussion designating the phrase from the user, and a phrase object data management module 32 which transmits the generated phrase object data to the composition assisting server 1, and stores/manages the received phrase object data distributed from the composition assisting server 1 in a phrase object data storage module 31.

The chat canvas display module 29 is structured to display the phrase object on the chat canvas based on the phrase object data stored in the phrase object data storage module 31.

The display mode of the message text data to be displayed by the chat canvas display module 29 is determined based on the display mode of the phrase object close to the display position of the message text data.

Each of the function modules of the composition assisting terminal 2 may be realized by the CPU which executes the predetermined program stored in the ROM, RAM, external storage unit, etc.

The framework of the collaborative composition realized by the composition assisting system 100 will be described referring to the flowcharts and explanatory views shown in FIGS. 5 to 10. Each step (including sub-step which is not designated with the code) may be executed in the changed order or in parallel so as not to cause contradiction to the processing content.

(Downloading/Trial Listening of Phrase Data: FIGS. 5(*a*), (*b*))

The phrase data acquisition module 24 of the composition assisting terminal 2 which is active is kept standby until the user inputs the download command of the phrase data (S100).

Various types of process for inputting the download command of the phrase data may be employed in accordance with the design. For example, the phrase data list stored in the phrase database 10 may be preliminarily acquired to be displayed on the pull-down menu such that the user is allowed to select the desired phrase data from the list.

In the embodiment, upon selection of the phrase data, the user is allowed to designate the incorporation point at which the selected phrase data are incorporated in the music data to be composed. The music data of the embodiment are structured to correlate each number of the predetermined unit time (hereinafter referred to as "time line") ordered in sequence along the time axis with the phrase data. So the incorporation point of the phrase data to be incorporated in the music data may be designated using the time line number.

When the download command of the phrase data is input, the phrase data acquisition module 24 generates the download request to contain the identification information of the selected phrase data and transmits it to the composition assisting server 1 (S101). The identification information of the phrase data may be formed of the instrument identification and the phrase identification, for example.

Upon reception of the download request from the composition assisting terminal 2 (S102), the phrase data supply module 11 of the composition assisting server 1 extracts the phrase data identification information from the received download request, reads the phrase data corresponding to the extracted phrase identification information from the phrase database 10 (S103), and transmits the read phrase data to the composition assisting terminal 2 which has transmitted the download request (S104).

Upon reception of the phrase data from the composition assisting server 1 (S105), the phrase data acquisition module 24 stores the received phrase data in correlation with the phrase data identification information in the phrase data storage module 20 (S106). FIG. 7 shows an exemplary data structure of the phrase data storage module 20.

Then the music data creation module 23 reads the music data from the music data storage module 21 to incorporate the combination of the stored phrase data and the incorporation point (time line number) to the music data designated upon the download command in the read music data to create the temporary music data (S107). This is the end of the phrase data downloading process.

The temporary music data may be created by acquiring plural phrase data. In the case where the download command is input with respect to the downloaded phrase data (that is, stored in the phrase data storage module 20), the phrase data commanded to be downloaded are read from the phrase data storage module 20 for creating the temporary music data without transmitting the download request.

Meanwhile, a player module 22 is kept standby until the user inputs the command for trial listening of the created temporary music data (S200).

Various types of the process for inputting the trial listening command of the temporary music data may be employed in accordance with the design. For example, the user may be allowed to input the trial listening command by clicking the button such as "rewind", "play", and "fast-forward" on the screen at the predetermined positions.

Upon input of the trial listening command of the temporary music data, the player module 22 plays the created temporary music data using the MIDI sound source (S201).

Specifically, the phrase data are played in the order of the time line number. If the plural phrase data are correlated with the same time line, they are simultaneously played. The phrase data may be played by the generally employed MIDI player.

The user acquires the desired phrase data from those shared via the composition assisting server 1, and is capable of trial listening the music having the phrase data incorporated in the music data at the time.

(Set of Phrase Object: FIG. 8)

The phrase object set module 30 of the composition assisting terminal 2 which is active is kept standby until the user inputs the command for opening the discussion designating the phrase data (hereinafter referred to as "phrase unit discussion") on the chat canvas (S300).

The method for inputting the command for opening the phrase unit discussion may be determined in accordance with the design. Likewise the case for inputting the command for downloading the phrase data, the command for opening the phrase unit discussion may be input by designating the phrase data using the pull-down menu and by clicking the predetermined command button on the screen.

As the phrase unit discussion is conducted on the chat canvas, the discussion position has to be specified on the chat canvas. The embodiment employs a framework that the phrase object is provided on the chat canvas to specify the discussion position for the phrase unit discussion. The phrase object may take various structures so far as the phrase data are specified. In the embodiment, the icon indicating the instrument and the phrase data title are combined to form the phrase object.

Upon input of the command for opening the phrase unit discussion, the phrase object set module 30 determines the display mode of the phrase object corresponding to the designated phrase data and the corresponding position on the chat canvas (specifically, the coordinate value of the chat canvas local coordinate system) so as not to overlap with the display mode and position of the other phrase object (S301).

As discussed in more detail below, the embodiment employs a framework that displaying of data is performed with the display mode different as to each phrase object (that is, for each phrase unit discussion). The message text data determined to belong to the same phrase unit discussion will be displayed in accordance with the display mode of the relevant phrase object. Various methods can be employed for displaying data with different display mode, for example, displaying data using different font can be employed. In the embodiment, the display color information is used as the display mode information and displaying of data is performed with the different display color for each phrase object.

The phrase object set module 30 generates the phrase object data which contain the identification information of the designated phrase data, and position information and display color information of the phrase object on the chat canvas (S302).

Then the phrase object data management module 32 transmits the thus generated phrase object data to the composition assisting server 1 (S303).

Upon reception of the phrase object data from the composition assisting terminal 2 (S304), the phrase object data management server module 17 of the composition assisting server 1 correlates the received phrase object data with the corresponding identification information so as to be stored/managed in the phrase object data storage server module 16 (S305). FIG. 10 shows an exemplary data structure of the phrase object data storage server module 16.

The phrase object data management server module 17 distributes the managed phrase object data to the composition assisting terminals 2 (S306). Preferably, for the composition assisting terminal 2 of the new user, it distributes the phrase object data which have been stored/managed for a predetermined period retroactive to the time when the user participated in the project collectively among those stored in the phrase object data storage server module 16.

Upon reception of the phrase object data distributed from the composition assisting server 1 (S307), the phrase object data management module 32 of the composition assisting terminal 2 stores the received phrase object data in the phrase object data storage module 31 (S308). In principle, the phrase object data storage module 31 can have the same data structure as that of the phrase object data storage server module 16.

When the storage content of the phrase object data storage module 31 is updated, the chat canvas display module 29 of the composition assisting terminal 2 generates the phrase object corresponding to the phrase data identification information contained in the updated phrase object data, and displays the generated phrase object on the chat canvas (specifically, on the display window corresponding to the chat canvas) based on the position information and the display color information contained in the updated phrase object data (S309).

FIG. 11 schematically shows a part of the chat canvas which displays the phrase object and the like. Various modes for the use of the display color of the phrase object may be employed, for example, by displaying the phrase object in the display color. In the embodiment, the area surrounding the phrase object (the range may be determined in accordance with the design) is colored with the display color as shown in FIG. 11.

Thus, the user designates the desired phrase data among those shared via the composition assisting server 1 and opens the phrase unit discussion on the chat canvas as the shared communication space.

(Phrase Unit Discussion: FIG. 12)

The chat data input module 26 of the composition assisting terminal 2 which is active is kept standby until the user inputs the chat data (S400).

As mentioned above, the chat data in the embodiment contain the position information of the message on the chat canvas, more specifically, the coordinate value of the local coordinate system on the chat canvas.

The coordinate value of the local coordinate system may be directly input through the keyboard, or input by directly designating the desired position on the chat canvas using such pointing device as the mouse. For example, upon input of the message through the keyboard first, the corresponding message text data may be displayed on the predetermined position on the screen, thereafter, the user may drag the displayed message text data by the pointing device such as the mouse and drop it at the desired position so as to designate the display position of the message by the drop position.

Upon input of the chat data, the chat data management module 28 transmits the chat data to the composition assisting server 1 together with the identification information of the user who has input the chat data (S401).

Upon reception of the chat data from the composition assisting terminal 2 (S402), the chat data management server module 15 of the composition assisting server 1 stores the received chat data in the chat data storage server module 14 (S403). FIG. 13 shows an exemplary data structure of the chat data storage server module 14.

Then the chat data management server module 15 distributes the stored chat data to the respective composition assisting terminals 2 (S404). Preferably, for the composition assisting terminal 2 of the new user, it distributes the chat data which have been received/stored for a predetermined period retroactive to the time when the user participated in the project collectively among those stored in the chat data storage server module 14.

Upon reception of the chat data distributed from the composition assisting server 1 (S405), the chat data management module 28 of the composition assisting terminal 2 stores the received chat data in the chat data storage module 27 (S406). In principle, the chat data storage module 27 can have the same data structure as that of the chat data storage server module 14.

Then the chat data management module 28 extracts the position information of the message from the stored chat data (S407).

The chat data management module 28 refers to the phrase object data storage module 31 to read the position information of the phrase object, and selects the phrase object at the closest position to the display position of the message contained in the stored chat data (position of the message text data) (S408). If none of the phrase object is set, the default phrase object having the predetermined display color information set may be selected, for example.

The chat canvas display module 29 displays the message text data contained in the stored chat data on the chat canvas based on the display color information of the selected phrase object stored in the phrase object data storage module 31, and the position information of the message object contained in the stored chat data (S409).

There are various modes for using the display color of the phrase object. For example, the message text data itself may be displayed in the display color, or background of the rectangular region for displaying the message text data may be displayed in the display color. In the embodiment, the region which surrounds the message text display area (the range is determined in accordance with the design) is colored with the display color as shown in FIG. 11.

In the embodiment, the message text data on the chat canvas is displayed in the same mode as that of the most adjacently positioned specific phrase object on the chat canvas. Then, when the user who intends to join the collaborative composition project posts the message at the location close to the specific phrase object on the chat canvas (provide the message text data close to the specific phrase object), the discussion of the specific phrase object is distinguished from that of the other phrase data visually with the different position and display mode. This makes it possible to allow discussions of the respective phrase data individually in parallel.

Meanwhile, however the display mode of the phrase object and the message text data vary depending on the phrase data, they are displayed on the same chat canvas. Then, the user can refer to or quote the message text data with respect to the other phrase data for posting the message easily. This makes it possible to conduct the discussion while crossing over the plural phrases.

(Creation, Sharing and Trial Listening of Music Data: FIGS. 14(a), (b))

When the composition assisting terminal 2 is active, the music data creation module 23 is kept standby until the user inputs the music data creation command (S500).

The method for commanding the music data creation may be determined in accordance with the design. In the embodiment, since the music data are formed by correlating the timelines with the phrase data, it is employed that the time line area for displaying the time lines arranged side by side along the time axis on the screen is provided to allow the user to drag the phrase object displayed on the chat canvas and to drop it on the time line of the area for commanding the music data creation (see FIG. 15).

When the phrase object is dropped on the time line as the music data creation command from the user, the music data creation module 23 reads the music data stored in the music data storage module 21, and incorporates the combination of the phrase data corresponding to the dropped phrase object and the time line number at the dropped position in the music data for creating the music data (updating) (S501). If the music data are not stored in the music data storage module 21, the aforementioned combination will be formed as the new music data.

The music data management module 25 transmits the created music data to the composition assisting server 1 together with the identification information of the user who has performed the drop operation (S502).

Upon reception of the music data from the composition assisting terminal 2 (S503), the music data management server module 13 of the composition assisting server 1 stores/manages the received music data in the music data storage server module 12 (S504). FIG. 6 shows an exemplary data structure of the music data storage server module 12.

Then the music data management server module 13 distributes the stored music data to the respective composition assisting terminals 2 (S505).

Upon reception of the music data distributed from the composition assisting server 1 (S506), the music data management module 25 of the composition assisting terminal 2 stores the received music data in the music data storage module 21 (S507). In principle, the music data storage module 21 can have the same data structure as that of the music data storage server module 12.

When the music data are stored in the music data storage module 21, the player module 22 is kept standby until the user inputs the command for trial listening of the music data (S600).

The command for trial listening of the music data may be input in various ways in accordance with the design. For example, each button for rewind, play, or fast-forward etc may be displayed on the timeline area and the user may be allowed to input the command for the trial listening by clicking the button.

When the command for trial listening of the music data is input, the player module 22 reads the music data stored in the music data storage module 21 and plays the music data using the MIDI sound source likewise the temporary music data (S601).

The user intended to join the collaborative composition project is allowed to create (update) the music data in synchronization with the other user, and to trial listen to the music data.

Variation Example

The present invention is applicable by changing in various manners, without limiting to the aforementioned embodiment. For example, instead of MIDI employed in the aforementioned embodiment as the format of the phrase data etc, other format such as WAV, AIFF may be employed. In such a case, the player module 22 can be realized using the generally employed player corresponding to the selected format.

In the aforementioned embodiment, the phrase unit discussion is conducted on the chat canvas. However, the discussion other than the phrase unit discussion, for example, the discussion about the music data in general may be conducted on the chat canvas. In such a case, it is preferable to provide an object indicating the discussion position for the music data in general so as to be displayed on the chat canvas likewise the phrase object. Alternatively, a conventional chat window (in which the messages are displayed in descending order of the input) may be provided in addition to the chat canvas such that the discussion other than the phrase unit discussion is conducted on the conventional chat window. As the user tends to frequently post messages or refer to the discussion about the music data in general, it is preferable to provide always a dedicated chat window for discussing such theme on the screen and to make that dedicated chat window accessible to the users.

In the aforementioned embodiment, the display mode (display color) of the phrase object is determined in the composition assisting terminal 2. However, the composition assisting server 1 may execute determination process of the display mode and distribute the phrase object data having the determined display mode information inserted, for example.

In the aforementioned embodiment, the phrase object at the closest position to the display position of the message is selected and the display mode of the selected phrase object is used for that of the message text data in the composition assisting terminal 2. However, the composition assisting server 1 may execute the process for correlating the message text data with the phrase object and distribute the chat data having the identification information or display mode information of the correlated phrase object inserted, for example.

In the aforementioned embodiment, the composition assisting server 1 includes the phrase database 10. However, each of the composition assisting terminals 2 may include the phrase database, for example. In this case, the module to download the phrase data is not required for the composition assisting terminal 2. However, the framework which ensures that each phrase database of the composition assisting terminals 2 has identical content (framework for synchronizing the respective databases on the regular basis) is required.

In the aforementioned embodiment, the user may be allowed to drag and drop the phrase object and the message text data displayed on the chat canvas using the pointing device such as the mouse so as to move them to the desired position on the chat canvas.

When the phrase object is moved, preferably, the message object displayed based on the display mode of the phrase object is determined as being the message relevant to the moved phrase data, and it is moved while keeping the relative positional relationship with the phrase object (see FIG. 16(a)). The aforementioned structure allows display positions of the phrase object and the message text data to be flexibly changed. This makes it possible to promote crossing over of the discussions by locating highly related discussions adjacently, and to enhance independency of the discussion by locating low related discussions mutually away. In this way, the respective discussions may be conducted more appropriately.

Further, it can be employed that, by designating the phrase object displayed on the chat canvas, the user can delete the designated phrase object and the group of the message objects displayed based on the designated phrase object collectively. Alternatively, such group may be retracted to a predetermined retract area on the screen such that the phrase object is only displayed (FIG. 16(b)).

In the aforementioned embodiment, the phrase object at the closest position to the display position of the message is selected as being close to the display position of the message. However, the present invention is not limited to the aforementioned structure. For example, the average display position of the phrase object and the message object group displayed based on the phrase object is calculated, and the calculated position is set as the reference point of the phrase object. The phrase object with the reference point at the closest position to the display position of the message may be selected as the one close to the display position of the message.

In the aforementioned embodiment, as to the trial listening of the phrase data, the trial listening method by incorporating the downloaded phrase data in the music data has been described. However, the user is allowed to trial listen to the phrase data itself. For example, when the user clicks the phrase object displayed on the chat canvas using the pointing device such as the mouse, the player module 22 plays the phrase data corresponding to the clicked phrase object.

In the aforementioned embodiment, in the composition assisting server 1, the phrase data supply function, the music data storage/management function, the chat data storage/management function, and the phrase object data storage/management function are implemented. However, each of those functions or any combination thereof may be individually implemented by the different servers.

BRIEF DESCRIPTION OF THE DRAWINGS

FIG. 2 is a block diagram showing the hardware and the function structure of a composition assisting server 1.

FIG. 4 is a view showing an exemplary data structure of a phrase database 10.

FIG. 6 is a view showing an exemplary data structure of a music data storage server module 12.

FIG. 7 is a view showing an exemplary data structure of a phrase data storage module 20.

FIG. 16 is a view for explaining the movement of the phrase object etc on the chat canvas.

Figure 1:
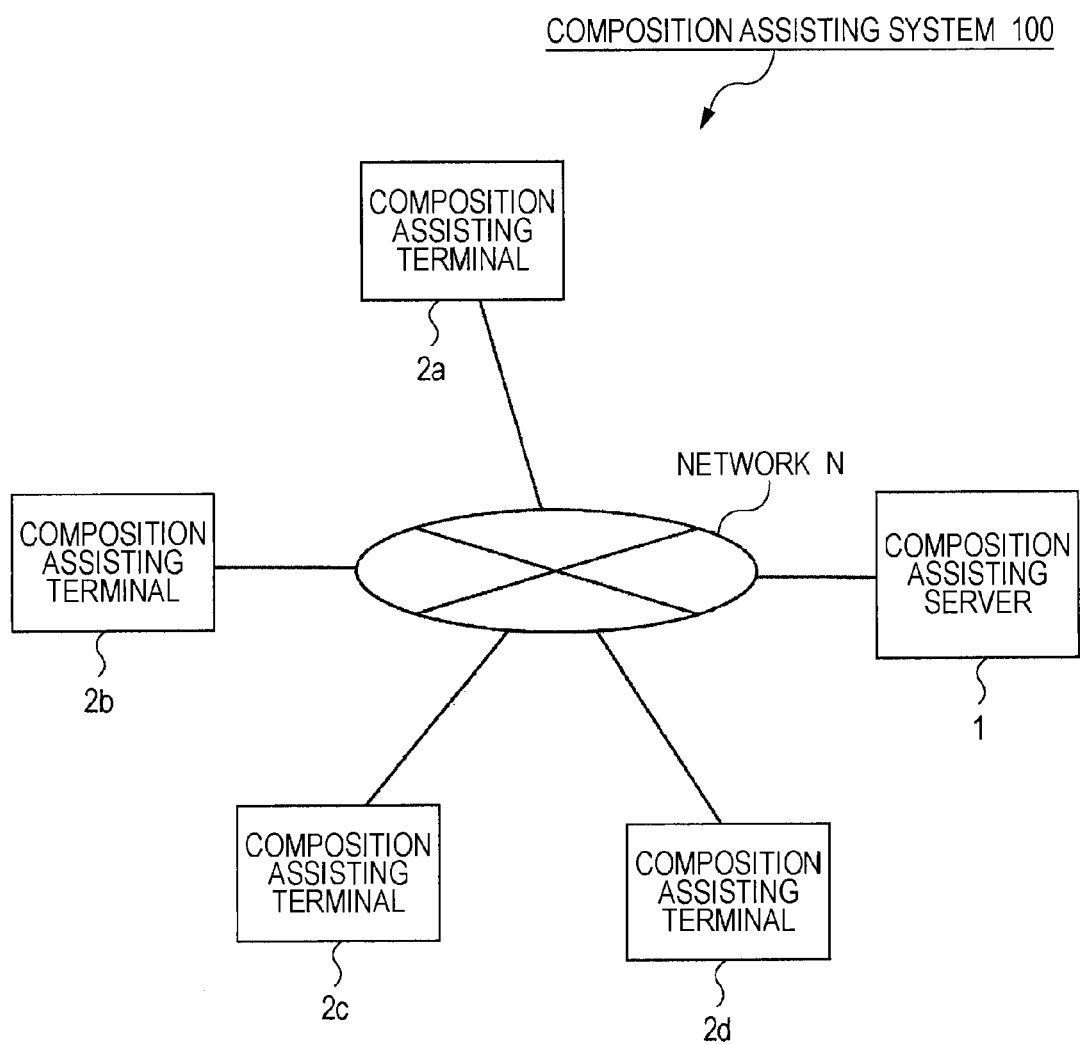
FIG. 1 is a block diagram schematically showing a structure of a composition assisting system 100.
Figure 3:
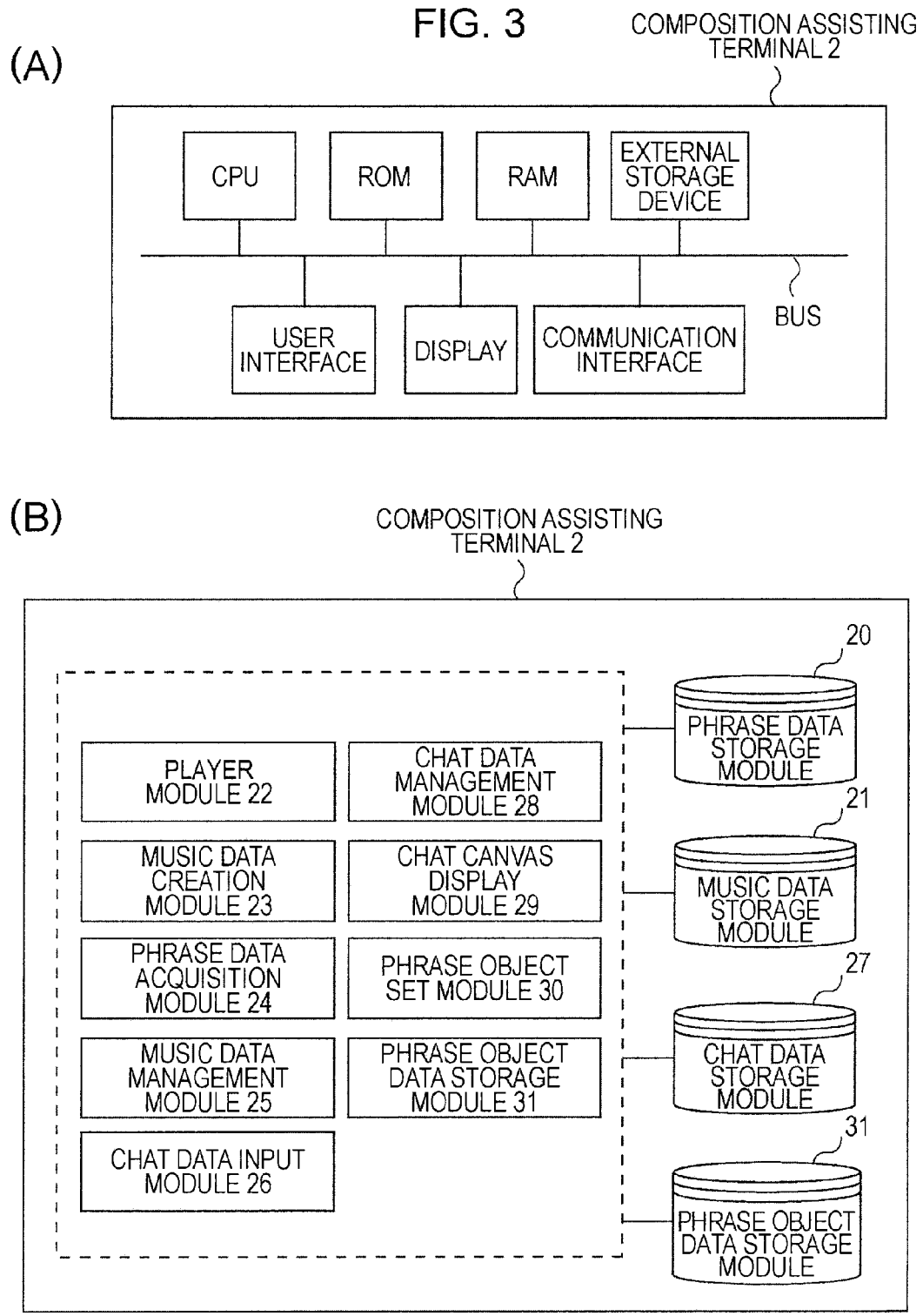
FIG. 3 is a block diagram showing the hardware and the function structure of a composition assisting terminal 2.

REFERENCE NUMERALS 1 composition assisting server
2 composition assisting terminal
10 phrase database
11 phrase data supply module
12 music data storage server module
13 music data management server module
14 chat data storage server module
15 chat data management server module
16 phrase object data storage server module
17 phrase object data management server module
20 phrase data storage module
21 music data storage module
22 player module
23 music data creation module
24 phrase data acquisition module
25 music data management module
26 chat data input module
27 chat data storage module
28 chat data management module
29 chat canvas display module
30 phrase object data set module
31 phrase object data storage module
32 phrase object data management module
100 composition assisting system

The invention claimed is:

1. An assisting apparatus for composition by combining phrases, comprising:
an interface configured to receive, from a user, a command for opening a discussion regarding a phrase;
a processor operatively coupled to the interface and configured to:
form, in response to the command, phrase object data which contains at least identification information of phrase data designated by the user, and position information of a phrase object, wherein the position information indicates a position where a phrase unit discussion is opened on a two-dimensional region comprising a chat canvas; and
generate chat data which contains at least text data of a message input by the user, and display position information on the chat canvas;
a communication device operatively coupled to the processor and configured to:
transmit the generated chat data to a server and receive the chat data distributed from the server; and
transmit the generated phrase object data to the server and receive the phrase object data distributed from the server; and
a display configured to display the phrase object or the message text data on the chat canvas based on the phrase object data or the chat data wherein a display mode of the message text data is determined based on a display mode of the phrase object located close to a display position of the message text data;
wherein the processor is further configured to determine, upon movement of the phrase object, that the message text data is associated with the phrase object, and move the message text data along with the phrase object such that a positional relationship between the phrase object and the message text data is maintained.

2. The composition assisting apparatus according to claim 1, wherein the processor is further configured to acquire the phrase data from a database for storing the phrase data in correlation with phrase identification information based on the command from the user and to store the phrase data in a memory, and wherein the processor is further configured to play the phrase data stored in the memory.

3. The composition assisting apparatus according to claim 2, wherein the processor is further configured to create music data by combining the acquired phrase data, wherein the communication device is further configured to transmit the created music data to the server and receive, the music data distributed from the sewer, and wherein the processor is further configured to store the music data in the memory and play the music data stored in the memory.

4. A composition assisting system including at least one server and a plurality of terminals, wherein:
the terminal includes:
a phrase object set module for generating phrase object data which contains at least identification information of phrase data designated by a user, and position information of a phrase object for indicating a position where a phrase unit discussion is opened on a two-dimensional region comprising a chat canvas upon reception of a command for opening the discussion designating the phrase from the user;
a chat data input module for generating chat data which contains at least text data of a message input by the user and display position information on the chat canvas upon reception of a command for inputting the chat data from the user;
a chat data management module for transmitting the generated chat data to the server, receiving the chat data distributed from the server, and storing the chat data in a memory;
a phrase object data management module for transmitting the generated phrase object data to the server, receiving the phrase object data distributed from the server, and storing the phrase object data in the memory; and
a display module for displaying the phrase object or the message text data on the chat canvas based on the phrase object data or the chat data stored in the memory;

wherein the server includes a phrase object data management server module for receiving the phrase object data from the terminal, storing the received phrase object data in a memory, and distributing the stored phrase object data to the terminal;

wherein a display mode of the message text data is determined based on a display mode of the phrase object located close to the display position of the message text data; and wherein the display module is further configured to determine, upon movement of the phrase object, that the message text data is associated with the phrase object, and move the message text data along with the phrase object such that a positional relationship between the phrase object and the message text data is maintained.

5. A phrase base composition assisting method comprising:

generating, with a processor of a terminal, phrase object data which contains at least identification information of phrase data designated by a user, and position information of a phrase object for indicating a position where a phrase unit discussion is opened on a two-dimensional region comprising a chat canvas upon reception of a command for opening the discussion designating the phrase from the user;

generating, with the processor of the terminal, chat data which contains at least text data of a message input by the user and display position information on the chat canvas upon reception of a command for inputting the chat data from the user;

transmitting the generated chat data to a server, receiving the chat data distributed from the server, and storing the chat data in a memory;

transmitting the generated phrase object data to the server, receiving the phrase object data distributed from the server, and storing the phrase object data in the memory;

displaying the phrase object or the message text data on the chat canvas based on the phrase object data or the chat data stored in the memory, wherein a display mode of the message text data is determined based on a display mode of the phrase object located close to the display position of the message text data; and determining, upon movement of the phrase object, that the message text data is associated with the phrase object and moving the message text data along with the phrase object such that a positional relationship between the phrase object and the message text data is maintained.

6. A non-transitory computer-readable medium having computer-readable instructions stored thereon, the instructions comprising:

instructions to generate phrase object data which contains at least identification information of phrase data designated by a user, and position information of a phrase object for indicating a position where a phrase unit discussion is opened on a two-dimensional region comprising a chat canvas-upon reception or a command for opening the discussion designating the phrase from the user;

instructions to generate chat data which contains at least text data of a message input by the user and display position information on the chat canvas upon reception of a command for inputting the chat data from the user;

instructions to transmit the generated chat data to a server, receive the chat data distributed from the server, and store the chat data in a memory;

instructions to transmit the generated phrase object data to the server, receive the phrase object data distributed from the server, and store the phrase object data in the memory;

instructions to display the phrase object or the message text data on the chat canvas based on the phrase object data or the chat data stored in the memory;

instructions to determine a display mode of the message text data based on a display mode of the phrase object located close to the display position of the message text data; and instructions to determine, upon movement of the phrase object, that the message text data is associated with the phrase object, and to move the message text data along with the phrase object such that a positional relationship between the phrase object and the message text data is maintained.

* * * * *

UNITED STATES PATENT AND TRADEMARK OFFICE
CERTIFICATE OF CORRECTION

| | | |
|---|---|---|
| PATENT NO. | : 8,024,663 B2 | Page 1 of 1 |
| APPLICATION NO. | : 12/515248 | |
| DATED | : September 20, 2011 | |
| INVENTOR(S) | : Uoi et al. | |

Figure 5:
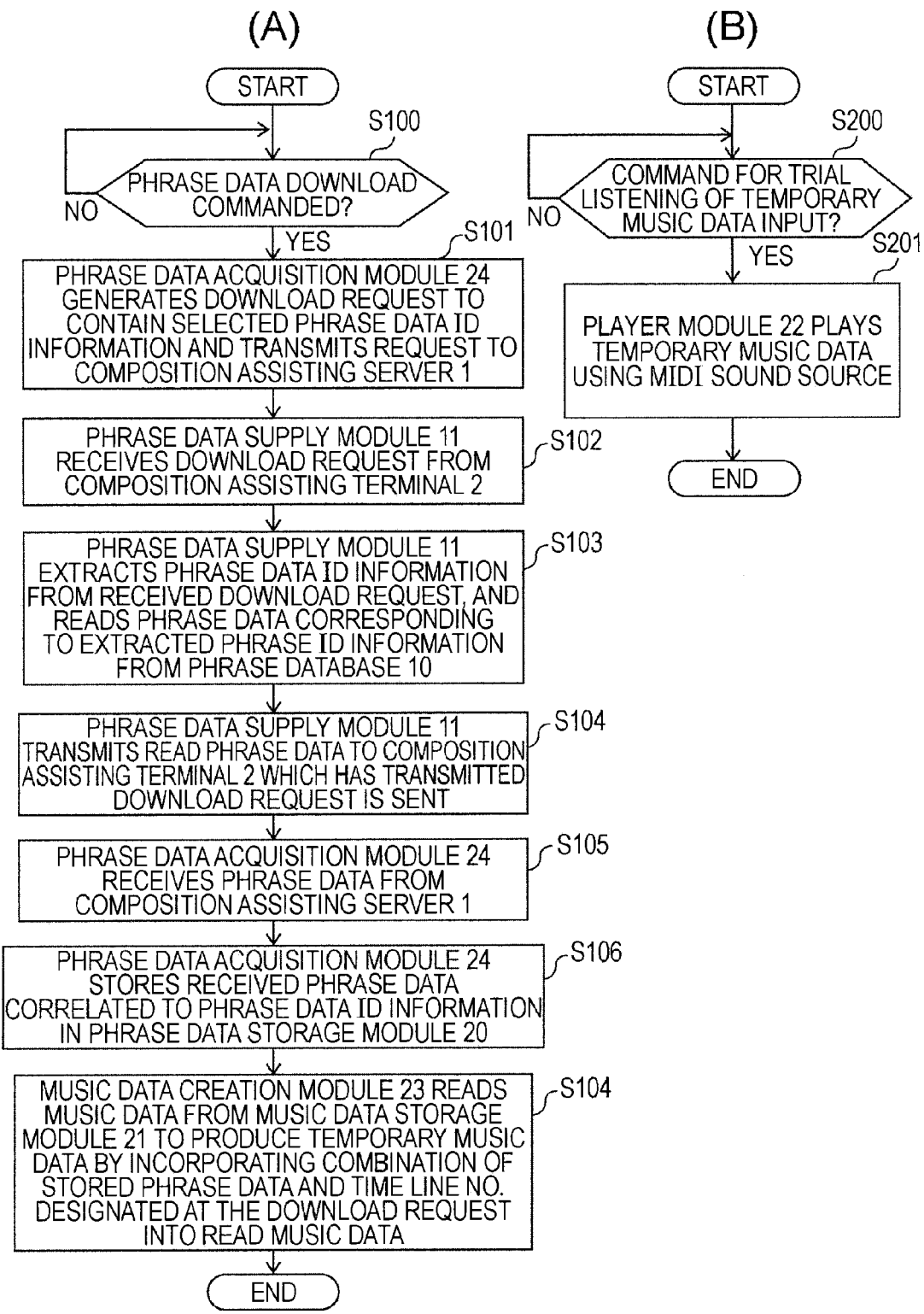
FIG. 5 is a flowchart of the process for acquisition/trial listening of the phrase data.
Figure 8:
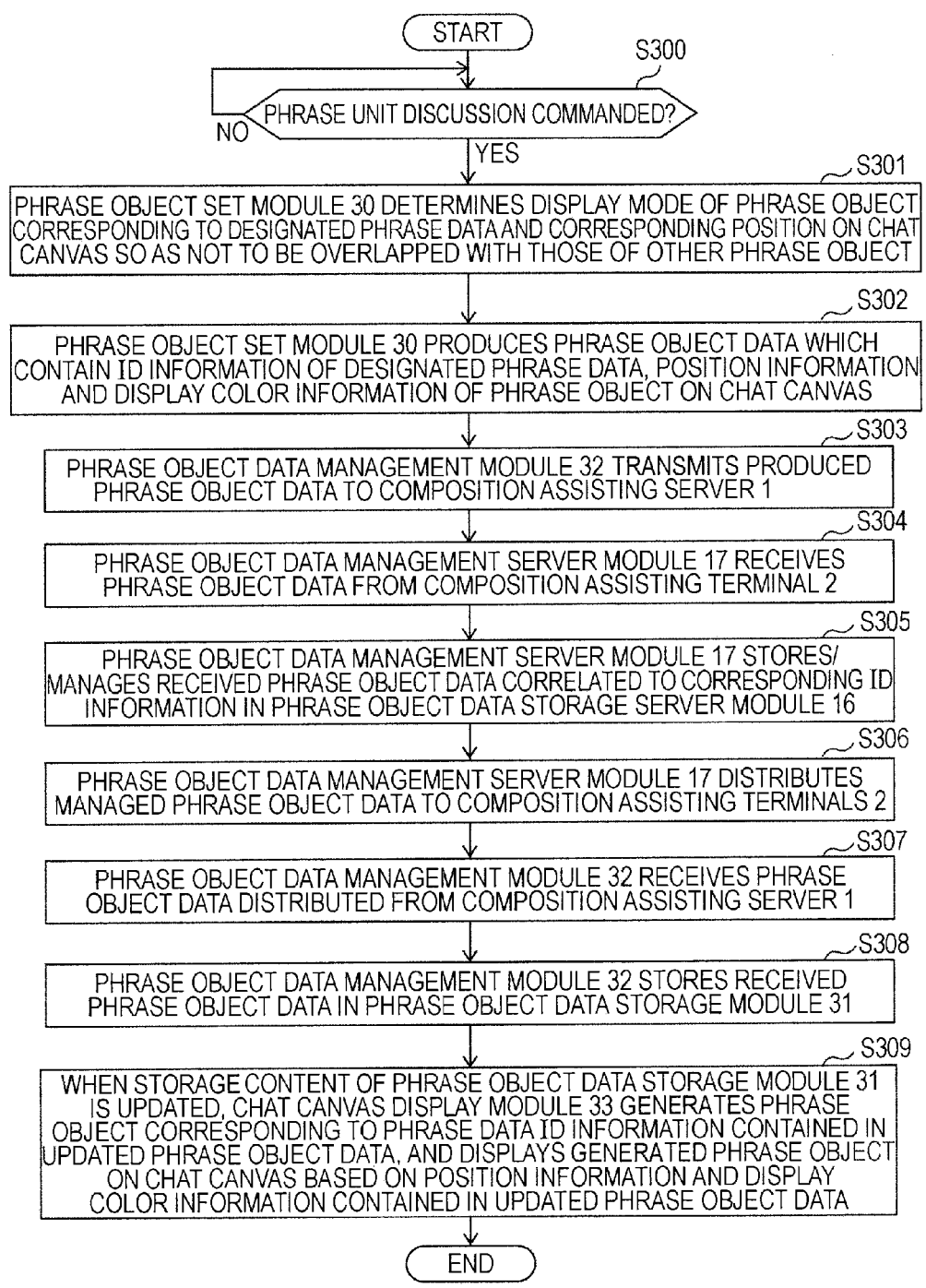
FIG. 8 is a flowchart of the process for setting the phrase object.
Figures 9, 10:
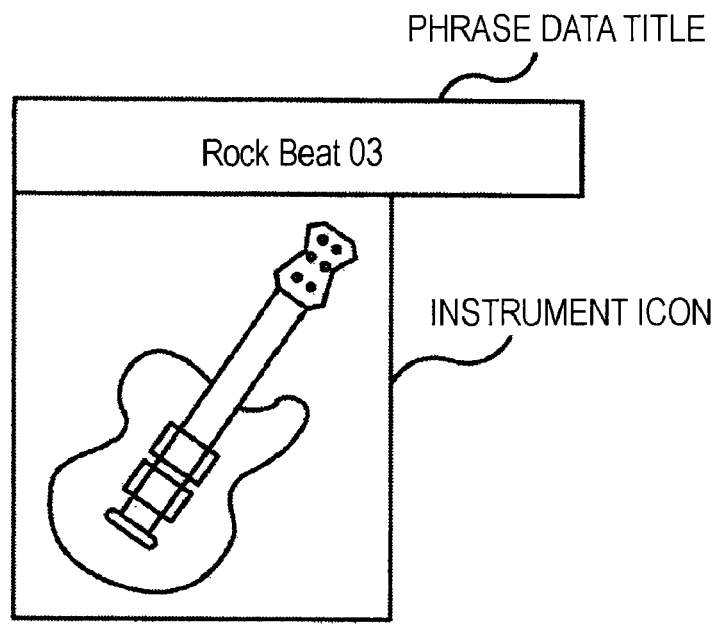
FIG. 9 is a view showing an example of the phrase object.
FIG. 10 is a view showing an exemplary data structure of a phrase object data storage server module 16.
Figure 11:
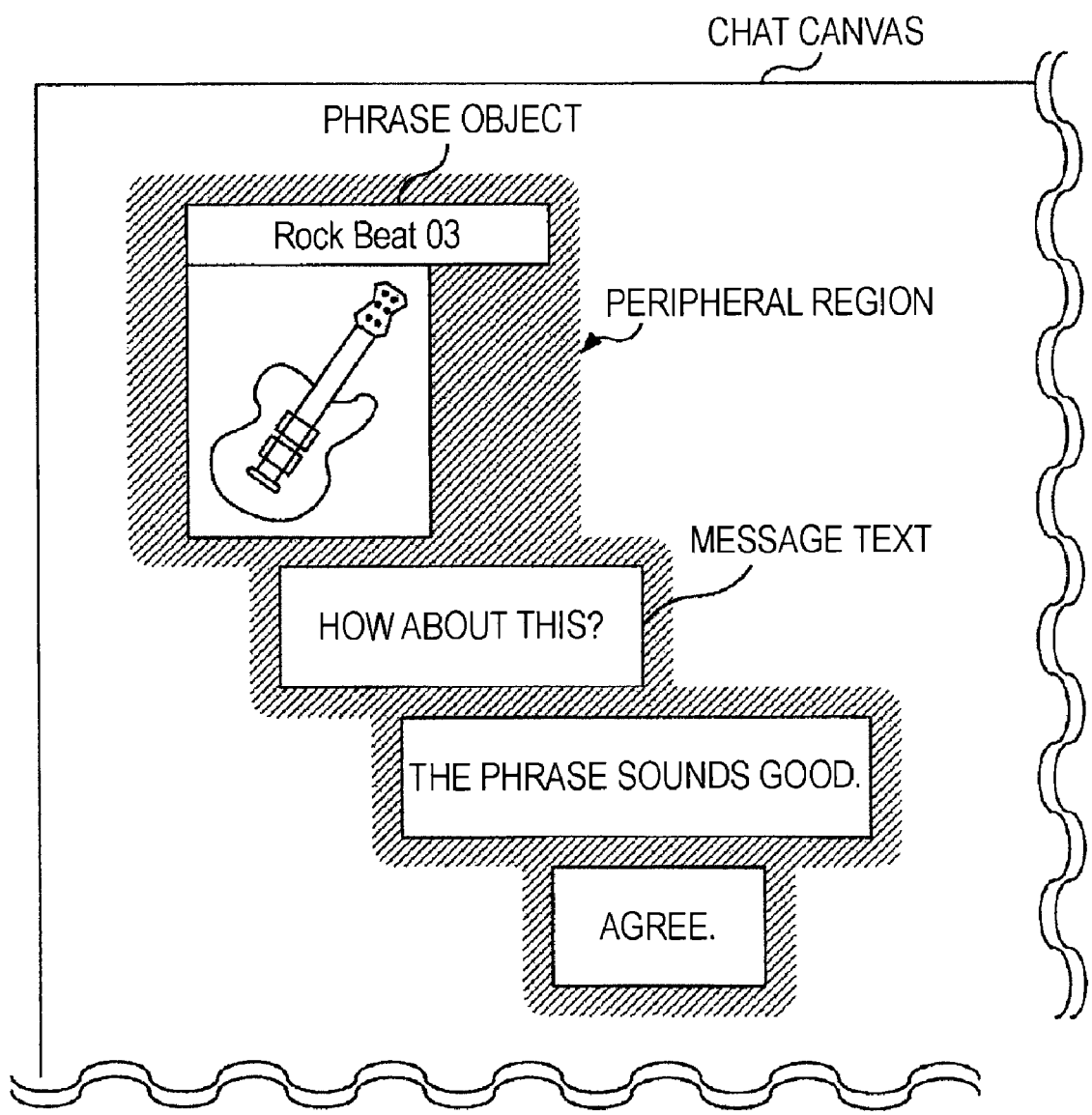
FIG. 11 is a view showing an exemplary display on a chat canvas.
Figure 12:
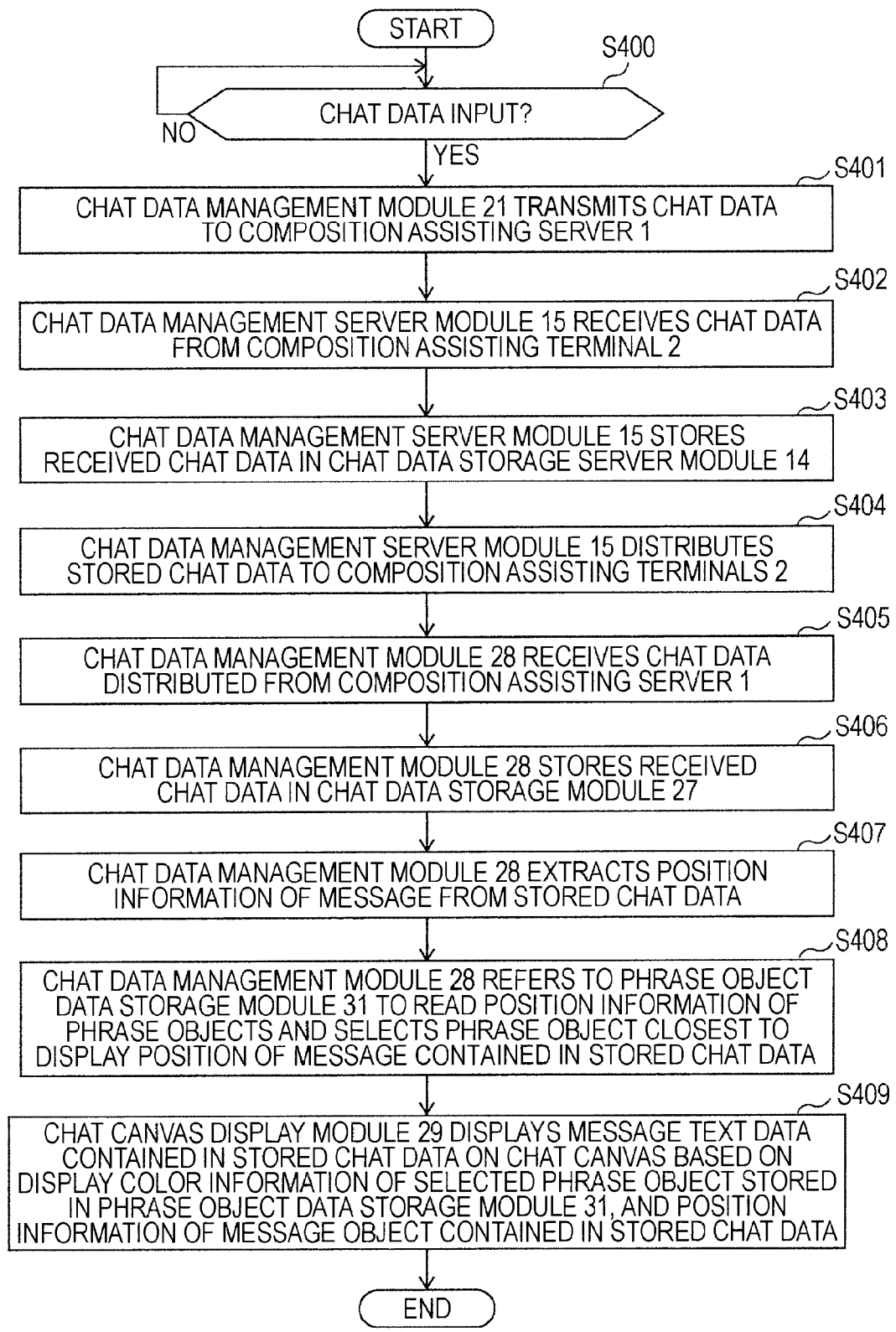
FIG. 12 is a flowchart of the process for conducting the phrase unit discussion.
Figure 13:
FIG. 13 is a view showing an exemplary data structure of a chat data storage module 13.
Figure 14:
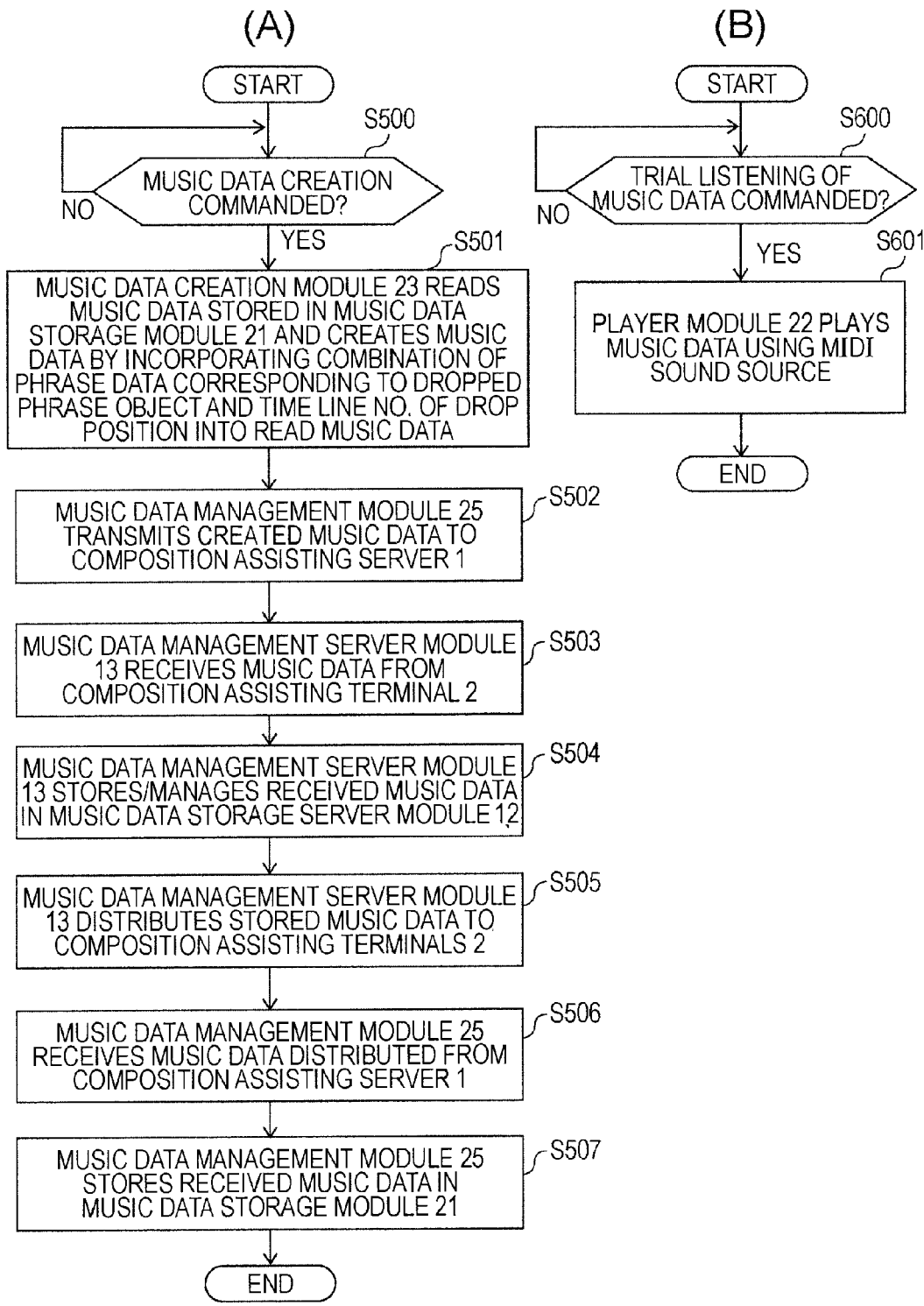
FIG. 14 is a flowchart of the process for creation/sharing/trial listening of music data.
Figure 15:
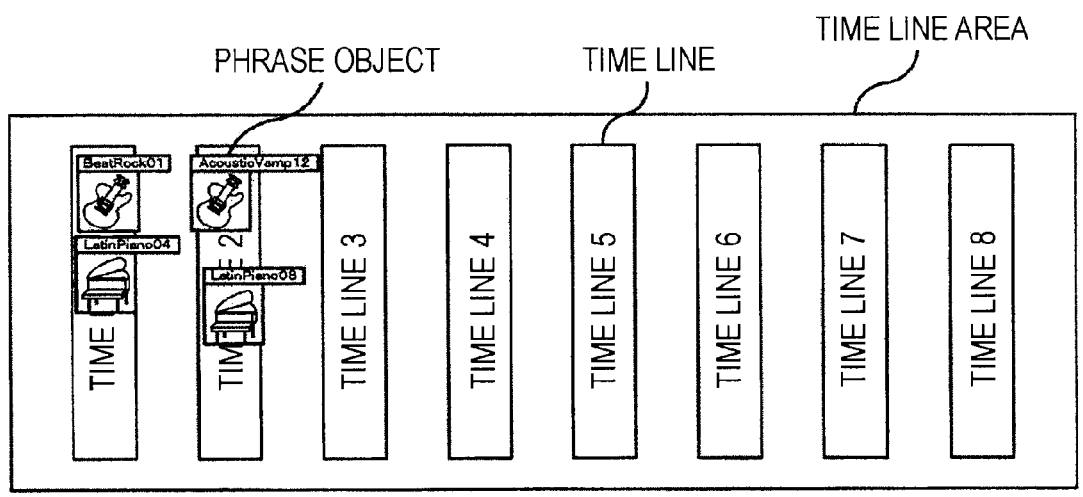
FIG. 15 is a view for explaining the process for creating the music data using the time line.

It is certified that error appears in the above-identified patent and that said Letters Patent is hereby corrected as shown below:

In Fig. 5, Sheet 5 of 14, below Tag "S106", delete Tag "S104" and insert Tag -- S107 --, therefor.

In Column 14, Line 36, in Claim 3, delete "sewer," and insert -- server, --, therefor.

In Column 15, Line 26, in Claim 5, delete "generating;" and insert -- generating, --, therefor.

Signed and Sealed this
Twenty-first Day of August, 2012

David J. Kappos
*Director of the United States Patent and Trademark Office*